(12) United States Patent
Ren et al.

(10) Patent No.: US 9,240,870 B2
(45) Date of Patent: Jan. 19, 2016

(54) QUEUE SPLITTING FOR PARALLEL CARRIER AGGREGATION SCHEDULING (71) Applicant: Telefonaktiebolaget LM Ericsson (Publ), Stockholm (SE)

(72) Inventors: Hong Ren, Kanata (CA); Christian Skärby, Stockholm (SE)

(73) Assignee: Telefonaktiebolaget L M Ericsson (publ), Stockholm (SE)

(*) Notice: Subject to any disclaimer, the term of this patent is extended or adjusted under 35 U.S.C. 154(b) by 237 days.

(21) Appl. No.: 13/660,108

(22) Filed: Oct. 25, 2012

(65) Prior Publication Data

US 2014/0119287 A1  May 1, 2014

(51) Int. Cl.
*H04L 5/00* (2006.01)
*H04W 72/12* (2009.01)

(52) U.S. Cl.
CPC .............. *H04L 5/001* (2013.01); *H04L 5/0041* (2013.01); *H04L 5/0044* (2013.01); *H04L 5/0046* (2013.01); *H04W 72/1263* (2013.01); *H04L 5/0053* (2013.01); *H04L 5/0094* (2013.01); *H04W 72/1252* (2013.01)

(58) Field of Classification Search
CPC .................................................... H04W 72/12
USPC .................................................. 370/312, 412
See application file for complete search history.

(56) References Cited

U.S. PATENT DOCUMENTS

| 7,493,428 | B2 | 2/2009 | Spencer |
| 7,810,630 | B2 | 10/2010 | Duchemin et al. |
| 7,890,674 | B2 | 2/2011 | Spencer |
| 8,141,103 | B2 | 3/2012 | Harran et al. |
| 2008/0077939 | A1 | 3/2008 | Harran et al. |
| 2008/0123671 | A1 | 5/2008 | Spencer |
| 2009/0123132 | A1 | 5/2009 | Han |
| 2010/0012463 | A1 | 1/2010 | Duchemin et al. |
| 2010/0191915 | A1 | 7/2010 | Spencer |
| 2010/0202394 | A1 | 8/2010 | Zhang et al. |
| 2010/0220589 | A1 | 9/2010 | Zheng et al. |

(Continued)

FOREIGN PATENT DOCUMENTS

| EP | 2071842 A2 | 6/2009 |
| EP | 2 503 812 A1 | 9/2012 |
| KR | 20110069684 A1 | 6/2011 |
| WO | 2009064045 A1 | 5/2009 |
| WO | 2010091421 A1 | 8/2010 |
| WO | 2012006120 A1 | 1/2012 |

(Continued)

OTHER PUBLICATIONS

International Search Report and Written Opinin dated Jul. 9, 2014 for International Application No. PCT/IB2013/059629, International Filing Date: Oct. 24, 2013 consisting of 18-pages.

(Continued)

*Primary Examiner* — Gary Mui
(74) *Attorney, Agent, or Firm* — Christopher & Weisberg, P.A.

(57) ABSTRACT

A method and system for carrier aggregation scheduling in a communication system are disclosed. According to one aspect, a method for carrier aggregation scheduling includes selecting a set of at least one component carrier from a group of candidate component carriers upon which to transmit data in a queue. The selecting of all component carriers in the set is performed prior to determining an amount of data to be assigned to any one of the component carriers in the set. Blocks of data from the queue are assigned to at least one of the component carriers in the set of selected component carriers based at least in part on an estimated amount of data that can be carried by each component carrier in the set.

19 Claims, 6 Drawing Sheets

(56) References Cited

U.S. PATENT DOCUMENTS

| | | | |
|---|---|---|---|
| 2010/0272091 A1* | 10/2010 | Fabien et al. ................. | 370/345 |
| 2011/0310800 A1* | 12/2011 | Lin et al. ...................... | 370/328 |
| 2012/0082100 A1 | 4/2012 | Ahmadi | |
| 2012/0099452 A1* | 4/2012 | Dai et al. ..................... | 370/252 |
| 2012/0147869 A1 | 6/2012 | Chhatriwala et al. | |
| 2012/0163161 A1 | 6/2012 | Zhang et al. | |
| 2012/0163338 A1 | 6/2012 | Zhang et al. | |
| 2012/0182879 A1* | 7/2012 | Tamura et al. ................ | 370/242 |
| 2012/0188960 A1 | 7/2012 | Hultell et al. | |
| 2013/0128828 A1* | 5/2013 | Baldemair et al. ........... | 370/329 |
| 2013/0148588 A1* | 6/2013 | Comeau et al. ............... | 370/329 |
| 2013/0176988 A1* | 7/2013 | Wang et al. ................... | 370/331 |
| 2014/0016523 A1* | 1/2014 | Sagae et al. .................. | 370/281 |
| 2014/0098661 A1* | 4/2014 | Huang .......................... | 370/229 |

FOREIGN PATENT DOCUMENTS

| | | | |
|---|---|---|---|
| WO | 2012006122 | A1 | 1/2012 |
| WO | 2012024348 | A1 | 2/2012 |
| WO | 2012045055 | A2 | 4/2012 |
| WO | 2012064772 | A1 | 5/2012 |
| WO | 2012078976 | A1 | 6/2012 |
| WO | 2012093074 | A1 | 7/2012 |

OTHER PUBLICATIONS

International Preliminary Report on Patentability dated Feb. 11, 2015 for International Application No. PCT/IB2013/059629, International Filing Date: Oct. 24, 2013 consisting of 30-pages.

NPL1_TSG_RAN_WG2_69bis_R2_102367_Apr. 12, 2010, Beijing China Title: "CA Impact on Logical Channel Prioritization" Source: Alcatel-Lucent Shanghai Bell, Alcatel-Lucent; Agenda Item: 7.1.1.7, Document for Discussion consisting of 6-pages.

NPL2_TSG_RAN_WG2_69bis_R2_102368_Apr. 12, 2010, Beijing China Title: "L2 Segmentation in Carrier Aggregation" Source: Alcatel-Lucent Shanghai Bell, Alcatel-Lucent; Agenda Item: 7.1.1.7, Document for Discussion consisting of 4-pages.

NPL3_Mikio_Iwamura_etal_Carrier_Aggregation Framework in_3GPP_LTE_Advanced WiMAX/LTE Update, IEEE Communications Magazine, pp. 60-67, Aug. 3, 2010 consisting of 8-pages.

Invitation to Pay Additional Fees dated Apr. 24, 2014 for International Application No. PCT/IB2013/059629, International Filing Date: Oct. 24, 2013 consisting of 6-pages.

Chung, Yao-Liang et al., "An Efficient Downlink Packet Scheduling Algorithm in LTE-Advanced Systems with Carrier Aggregation", The 8th Annual IEEE Consumer Communications and Networking Conference-Wireless Consumer Communication and Networking, Las Vegas, NV, Graduate Institute of Communication Engineering, National Taiwan University, Taipei, Taiwan, R.O.C., pp. 129-133, (2011).

Eun, Do Young et al., "Network Decomposition: Theory and Practice", IEEE/ACM Transactions on Networking, vol. 13, No. 3, pp. 526-539, (Jun. 2005).

Yuan, Guangxiang et al., "Carrier Aggregation for LTE-Advanced Mobile Communication Systems", IEEE Communications Magazine, LTE Technology Update, pp. 88-93, (Feb. 2010).

* cited by examiner

QUEUE SPLITTING FOR PARALLEL CARRIER AGGREGATION SCHEDULING

FIELD

The present invention relates to network communications and in particular to a method and system for allocating component carriers in a communication network.

BACKGROUND

Carrier aggregation (CA) is a feature of Long Term Evolution (LTE) technology, where transmission between a base station, such as an evolved node B (eNB), and a user equipment (UE), such as a wireless handset, is performed using multiple component carriers (CCs) simultaneously. A component carrier on which a radio resource control (RRC) is originally setup is referred to as the primary CC for a UE, and the cell to which the primary CC is allocated is called the primary cell (PCell). The LTE network can add other cells to which other CCs are allocated, and these cells are called secondary cells (SCells).

When a queue of data is to be transmitted on multiple CCs, the eNB must decide how much of the data to transmit on each CC. Thus, the queue is split into multiple parts so that each part is assigned to a different CC. This is referred to as queue splitting. Component carriers can be scheduled sequentially. In such a case, queue splitting is trivial. Once scheduling of one CC is finalized, the number of bits that a queue is allowed to transmit on that CC can be subtracted from the total number of bits in the queue. Thus, the scheduler only sees the amount of bits remaining in the queue after scheduling the previous CCs. In contrast to sequential assignment of data to CCs, CCs can theoretically be assigned portions of data of the queue in parallel. However, with such parallel operation, the amount of bits to be assigned to each CC is not known, thereby potentially wasting resources by allocating too much to one CC and not enough to another CC.

SUMMARY

The present invention advantageously provides a method and system for carrier aggregation scheduling in a communication system. According to one aspect, a method for carrier aggregation scheduling includes selecting a plurality of component carriers from a group of candidate component carriers upon which to transmit data in a queue. The selecting of the plurality of component carriers is performed prior to determining an amount of data to be assigned to any one of the selected component carriers. Blocks of data from the queue are assigned to at least one of the plurality of component carriers in the set of selected component carriers based at least in part on an estimated amount of data that can be carried by each selected component carrier.

In one embodiment of this aspect, the selecting of a candidate component carrier from the group of candidate component carriers is based at least in part on an amount of data in the queue. In some embodiments, the selecting of a candidate component carrier from the group of candidate component carriers is based at least in part on a channel condition associated with the candidate component carrier. In one embodiment, the method further includes allocating physical downlink control channel, PDCCH, resources to each selected component carrier of the group of candidate component carriers prior to the assigning of blocks of data from the queue. In yet another embodiment of this aspect, the assigning of blocks of data from the queue to at least one of the selected component carriers is based at least in part on a weight associated with the queue. In some embodiments, the assigning of blocks of data from the queue to at least one of the selected component carriers is based at least in part on an estimated resource usage of a cell of the communication network, the cell being one of a group of cells to which the plurality of the selected component carriers are assignable. In these embodiments, the estimated resource usage may be based at least in part on a number of physical resource blocks, PRB, of the cell that are assignable to the queue. Further, the number of physical resource blocks assignable to the queue may be based at least in part on a channel quality.

According to another aspect, the invention provides a system for allocating data of a queue to at least one component carrier of a group of candidate component carriers, The allocated data is to be transmitted to a user equipment, UE. The system includes a memory and a processor. The memory is configured to store a queue of data to be transmitted to the UE. The processor is in communication with the memory and is configured to select at least one component carrier from the group of candidate component carriers. The selecting of all the selected component carriers is performed before determining an amount of data that any one of the selected component carriers can carry. The processor is also configured to schedule physical downlink control channel, PDCCH, resources for transmission by each of the at least one component carrier selected from the group of candidate component carriers. The processor is further configured to allocate data of the queue among each of the at least one component carrier selected from the group of candidate component carriers. The allocation is based at least in part on an estimated amount of data that each of the at least one component carrier can carry.

According to this aspect, in one embodiment, selecting at least one component carrier is based at least in part on a channel condition. In another embodiment, selecting at least one component carrier is based at least in part on an amount of data in the queue. In yet another embodiment, an amount of data allocated to a particular selected component carrier for which physical downlink control channel, PDCCH, resources are allocated for transmission by the particular selected component carrier. In this embodiment, PDCCH resources may be allocated for transmission by the particular selected component carrier based at least in part on a weight associated with the queue. Further, a weight associated with the queue may be based at least in part on an average data rate. In some embodiments of this aspect, the processor is further configured to estimate resources consumed by allocation of data of the queue among each of the at least one component carrier selected from the group of candidate component carriers. In another embodiment, the selected at least one component carrier are selected from a pool of component carriers shared by a plurality of communication cells According to yet another aspect, the invention provides a method of allocating data of a queue to at least one of a plurality of component carriers, the data of the queue being destined to a user equipment, UE. The method includes assigning a weight to the queue. At least one of the plurality of component carriers is selected for data transmission to the UE. The plurality of component carriers is a set of candidate component carriers available for transmission. The selecting of all the selected component carriers is performed prior to determining an amount of data to be carried by any one of the selected component carriers. For each selected component carrier, physical downlink control channel, PDCCH, resources of the selected component carrier are allocated to the queue based on a weight assigned to the queue. A fraction of an amount of data of the queue is assigned to each selected component carrier based at least in part on an estimated amount of data that can be carried by the selected component carrier.

According to this aspect, some embodiments further include estimating a resource usage associated with transmitting an assigned fraction of the amount of data of the queue on a component carrier. In one embodiment of this aspect, the selected component carriers are selected from a pool of component carriers shared by a plurality of communication cells. Another embodiment further includes outputting a list of queues that have been allocated PDCCH resources by a component carrier. In these embodiments, queues of the list may be sorted according to a weight assigned to each queue. Further, PDCCH resources may be allocated to the listed queues in order of decreasing weight.

According to another aspect, the invention provides a method for allocating data from a queue to a plurality of selected component carriers. The method includes initializing cell resource usage to zero for all cells in a group. A queue is selected based on a weight assigned to the queue. A cell associated with the selected queue whose cell resources have not been exhausted is identified. An amount of data that can be transmitted by the identified cell without exceeding a resource limit of the cell is estimated. Remaining data in the selected queue is determined. The remaining data in the selected queue is equal to data available for the identified cell minus the estimated amount of data that can be transmitted by the identified cell. A resource usage of the identified cell is determined, The resource usage of the identified cell is equal to a previous cell resource usage plus estimated cell resources consumed by the selected queue. These steps are repeated for each queue until all cell resources have been used According to this aspect, each cell may be associated with a different component carrier. Further, the component carriers of the cells may be selected from a group of candidate component carriers prior to determining an amount of data that can be carried by a selected carrier.

BRIEF DESCRIPTION OF THE DRAWINGS

A more complete understanding of the present invention, and the attendant advantages and features thereof, will be more readily understood by reference to the following detailed description when considered in conjunction with the accompanying drawings wherein.

DETAILED DESCRIPTION

Before describing in detail exemplary embodiments that are in accordance with the present invention, it is noted that the embodiments reside primarily in combinations of apparatus components and processing steps related to allocation of component carriers in a communication network. Accordingly, the system and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

As used herein, relational terms, such as "first" and "second," "top" and "bottom," and the like, may be used solely to distinguish one entity or element from another entity or element without necessarily requiring or implying any physical or logical relationship or order between such entities or elements.

In embodiments described herein, parallel assignment of resources and scheduling of resources of component carriers, CCs, is provided. The process is performed in two stages. In the first stage, CCs that are intended to be used to transmit data in a queue are determined. An exact number of bits assigned to a CC is determined in the second stage after physical down link control channel, PDCCH, resources are allocated. When resources are pooled for multiple cells, the second stage can be performed independently or jointly using resource pooling.

Figure 1:
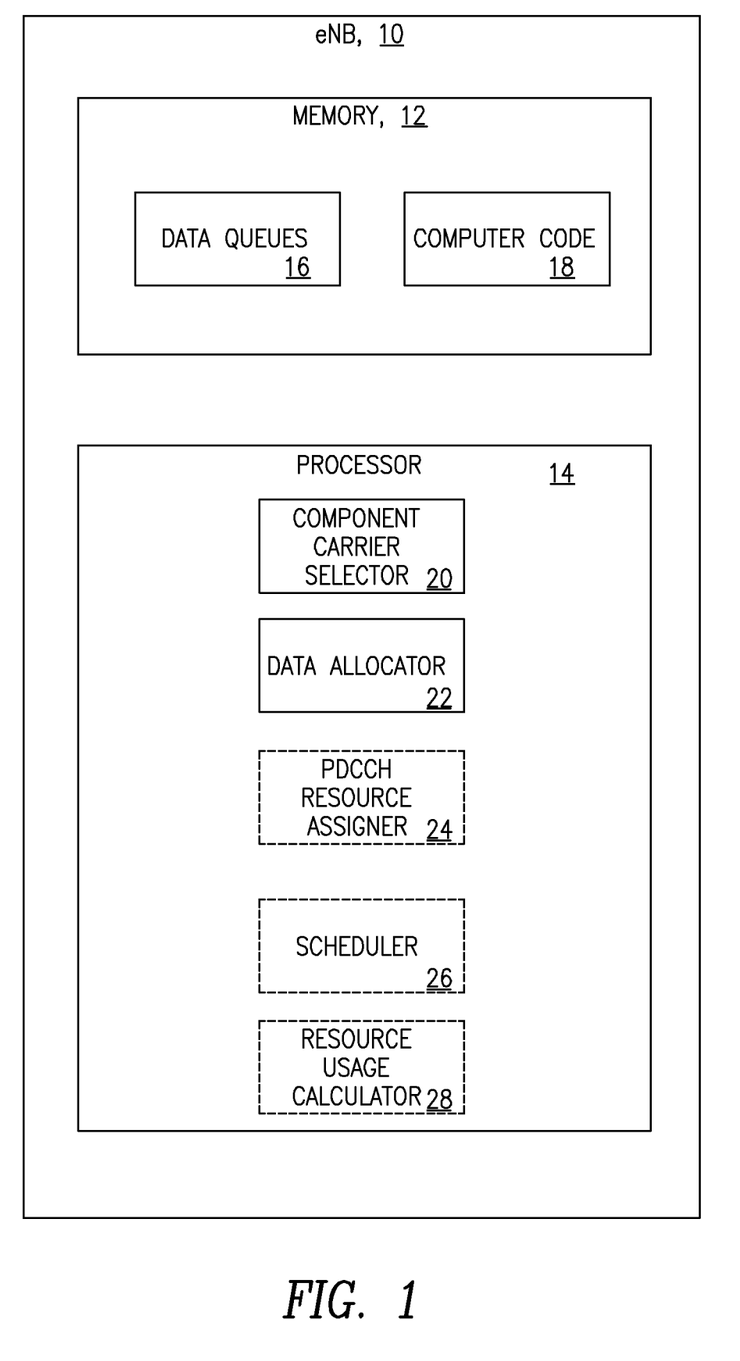
FIG. 1 is a block diagram of an exemplary eNB constructed in accordance with principles of the present invention.

Referring now to the drawing figures, in which like reference designators denote like elements, there is shown in FIG. 1 a block diagram of an exemplary eNB 10 constructed in accordance with principles of the present invention. The eNB 10 includes a memory 12 and a processor 14. The memory 12 includes queues of data 16 to be transmitted to one or more UEs. The memory 12 also includes computer code 18 to be executed by the processor 14. The processor 14 executes the computer code 18 to perform the functions of component carrier selection 20 and data allocation 22 as described herein. The processor 14 may further execute the computer code 18 to perform additional functions including PDCCH assignment 24, scheduling 26 and resource usage calculation 28, as is described more fully below.

In one embodiment, the processor 14 is configured to select at least one component carrier from a group of candidate component carriers, CCs. All of the selected component carriers are selected by the component carrier selector 20 prior to determining an amount of data to be carried by any one of the selected component carriers. Selection of CCs may be based on a variety of factors including an amount of data in a queue and a channel condition associated with the CC. The processor 14 may further be configured to assign PDCCH resources, by the PDCCH resource assigner 24, for transmission by each of at least one selected CC. The data of the queue may be allocated among each of the at least one component carrier based at least in part on an amount of PDCCH resources scheduled by the scheduler 26 for transmission by the at least one component carrier. The amount of PDCCH resources scheduled for transmission may be based at least in part on a weight associated with the queue. In turn, the weight associated with the queue may be based at least in part on an average data rate. The processor 14 may further be configured to estimate, by the resource usage calculator 28, resources consumed by allocation of data of the queue among the component carriers selected from a group of candidate component carriers.

Figure 2:
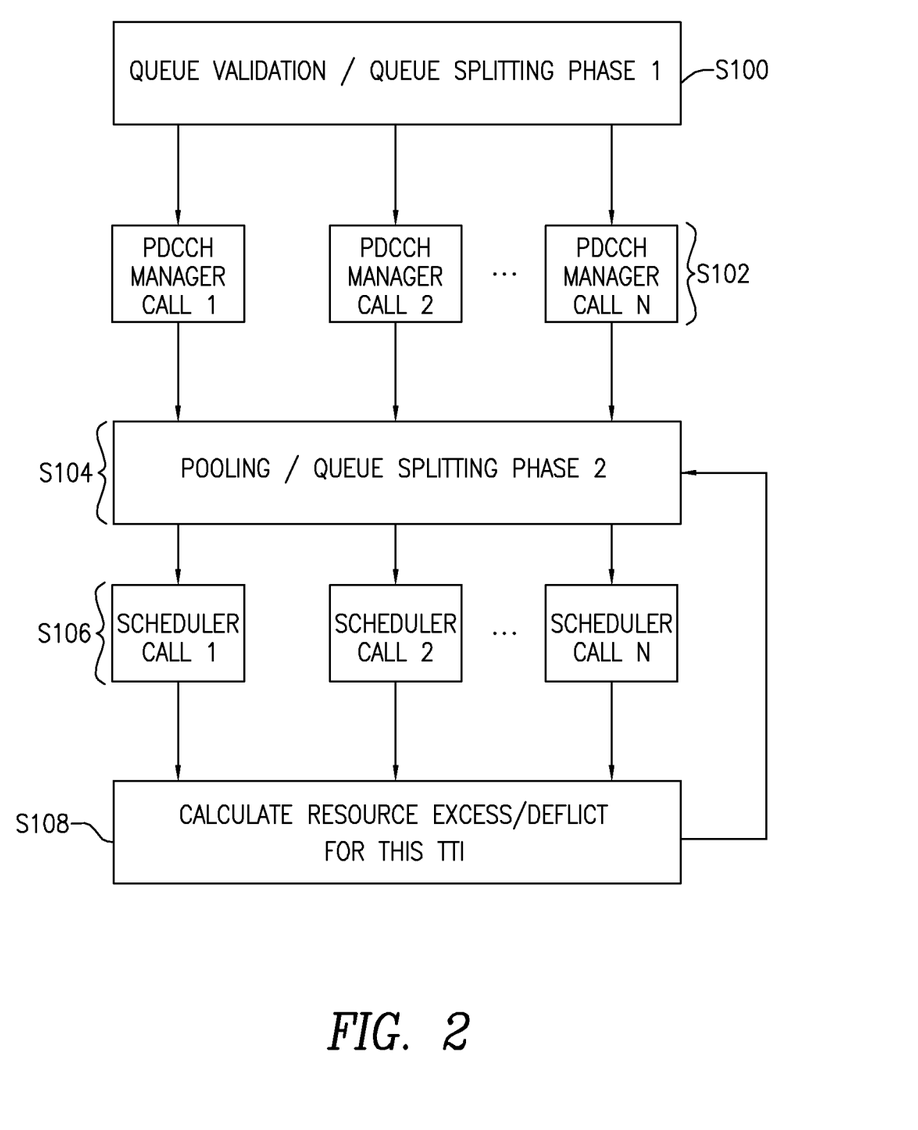
FIG. 2 is a flowchart of an exemplary process of allocating data from a queue to a plurality of CCs in accordance with principles of the present invention.

FIG. 2 is a flowchart of an exemplary process of allocating data from a queue to a plurality of CCs in accordance with principles of the present invention. Initially, each one of at least one queue is validated by assigning a weight or priority to each queue and ordering the queues based on priority or weight. At least one CC is then selected for each queue (block S100). Note that in some embodiments, the order of validation and CC selection may be reversed, with CC selection occurring before validation. Once validation and CC selection have been completed, a PDCCH manager of each cell assigns PDCCH resources to at least some of the higher weight CCs to be transmitted by the cell (block S102). PDCCH resources are used to transmit scheduling decisions to UEs. It is possible that a UE may not get PDCCH resources allocated to it if the resource it can use is already allocated to another UE that has a higher weight queue.

After assigning PDCCH resources, a determination is made as to how much data of a queue to assign to each of the CCs selected for the queue (block S104). Scheduling and link adaptation are performed for each CC to be used during a current transmission time interval (TTI) (block S106). The scheduling and link adaptation end when all scheduling entities are scheduled or cell resources are exhausted. The amount of resources actually used is calculated and compared to an estimated amount of resources to determine an excess or deficiency of resources for the current TTI (block S108). If there is an excess or deficit of resources, the amount of data assigned to each queue may be adjusted (block S104).

Note that if some physical resource blocks, PRBs, are shared by multiple cells, a pooling function that distributes the shared resources to each cell can be used. Pooling (block S104) can be performed after PDCCH resource allocation (block S102). The shared resources can be limited by hardware capability, or by license. Pooling may be performed across all cells that share the resources. After pooling, cell level scheduling and link adaptation (block S106) can start once each cell knows the amount of resources assigned to the cell.

A factor to consider for queue splitting is that a sufficient amount of data be allocated to each CC. If too much data is allocated, the CC cannot carry all the data assigned to it. If not enough data is allocated, communications spectrum and processing resources are wasted. Another factor to consider for queue splitting is that an algorithm for allocating data to each CC should be simple in order to conserve processor and memory resources needed for scheduling and link adaptation. Note further that queue splitting can be performed across a plurality of cells. Thus, if the queue splitting is performed jointly with pooling, then all cells involved in the resource pooling should be considered for resource allocation. It may be assumed that all serving cells for a UE used for carrier aggregation are a subset of the pooling cells. Thus, when pooling is performed jointly with queue splitting, the selected component carriers are selected from a pool of CCs shared by a plurality of communication cells, e.g., eNBs.

Figure 3:
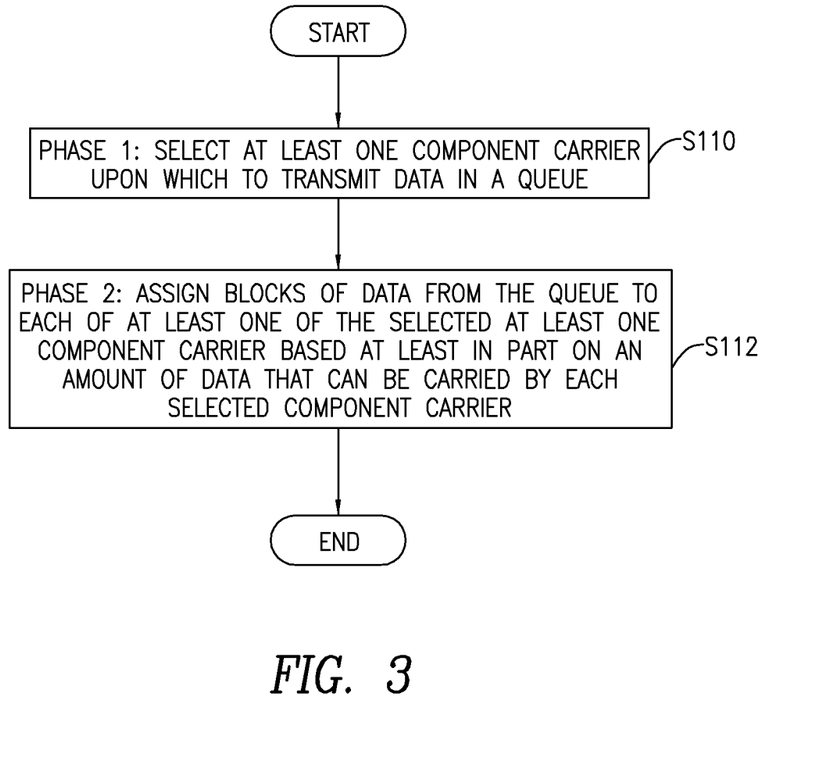
FIG. 3 is a flowchart of an exemplary two-phase process for allocating data to CCs in accordance with principles of the present invention.

FIG. 3 is a flowchart of an exemplary two-phase process for allocating data to CCs in accordance with principles of the present invention. In phase 1, at least one CC upon which to transmit data of a queue is selected (block S110). The selecting of all selected CCs is performed before allocating data to any one of the CCs. In phase 2, blocks of data from the queue are assigned to each of the at least one CC based at least in part on an amount of data that can be carried by each CC (block S112). Thus, in the first phase, CCs that are intended to be used to transmit data in a queue are selected, whereas the exact amount of data assigned to a CC is determined later in the second phase when a good estimation of the number of bits that can be transmitted by a CC can be made.

Selection of CCs in phase 1 may be based on a variety of factors including an amount of data in a queue and a channel condition associated with the CC. For example, if a queue does not have much data, there may be no need to use multiple CCs. For example, multiple CCs may not be required to transmit a frame of voice data. Thus, an amount of data in a queue may be compared to a threshold, with multiple CCs being selected for the queue only if the amount of data in the queue exceeds the threshold. As another example, if a channel condition experienced by a UE for a given CC is not good, i.e., does not exceed a predetermined channeled quality threshold, the CC may not be selected. The channel condition can be represented by a wideband signal to interference plus noise ratio (SINR) derived from a wideband channel quality indicator (CQI).

One of several options for CC selection may be employed. Exemplary pseudo-code for one option based on an amount of data in a queue is as follows:

```
For a given queue:
    If the total amount of data in the queue is less than a threshold:
        If the CC is the primary CC:
            Then the CC is selected
        Else:
            The CC is not selected
    Else:
        The CC is selected
    Endif.
```

Note that a weight assigned to a queue in the validation phase may be based on channel quality. Since a queue with a low weight is unlikely to be selected for PDCCH resource allocation, channel quality is implicitly factored into the CC selection process.

According to another option for CC selection based at least in part on channel conditions, the following exemplary pseudo-code may be implemented:

```
For a given queue:
    If a wideband SINR for the CC is less than a SINR threshold:
        If a total amount of data in the queue is less than a threshold:
            If the CC is the primary CC:
                The CC is selected
            Else:
                The CC is not selected
            Endif:
        Else:
            The CC is selected
        Endif:
    Else:
        The CC is not selected
    Endif.
```

In this option, if the SINR for all serving cells is below the SINR threshold, then no CC will be selected. Thus, the option may be modified to select one or more CCs with the highest SINRs when none of the CCs have an SINR above the SINR threshold. Note that the SINR threshold may be based on an average SINR across all CCs.

Figure 4:
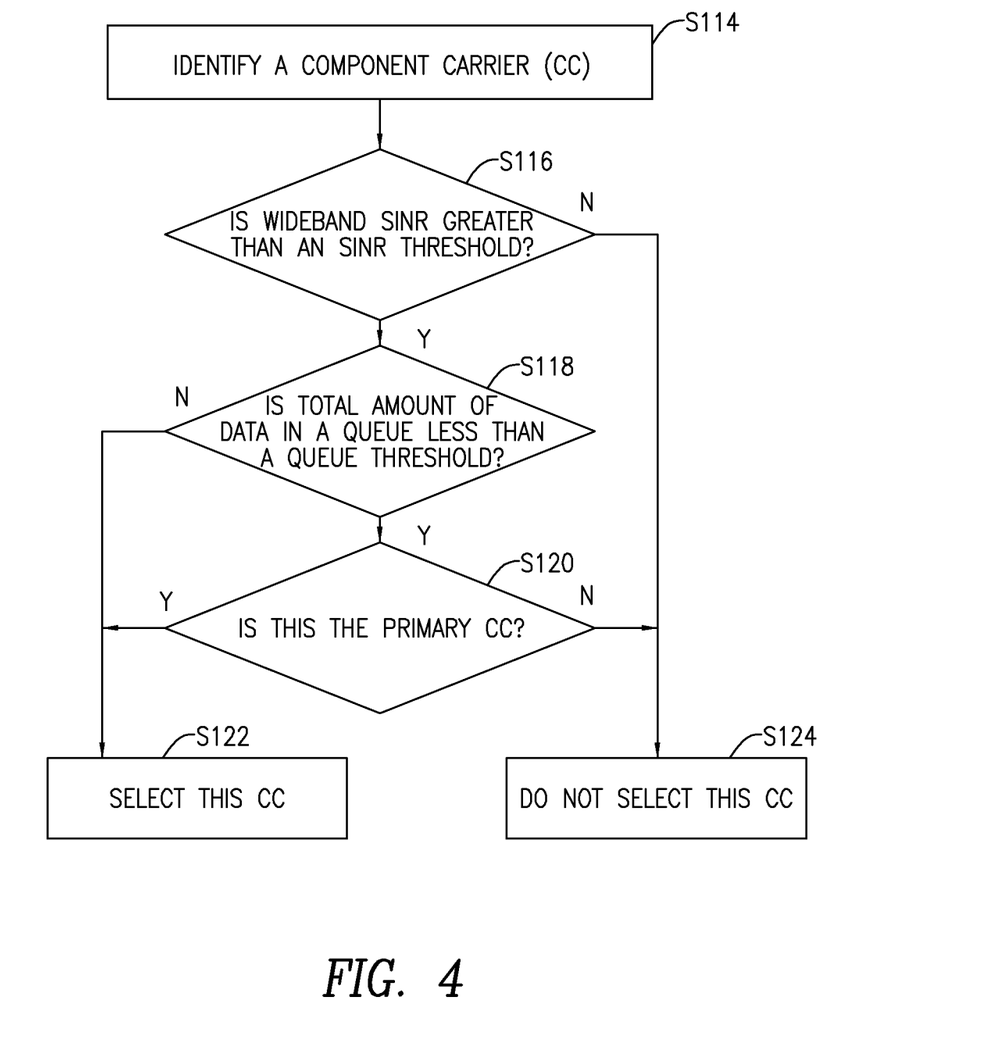
FIG. 4 is a flowchart of an exemplary process for selecting CCs for allocation of data of a queue in accordance with principles of the present invention.

An exemplary process for selecting CCs for allocation of data of a queue in accordance with principles of the present invention is described with reference to FIG. 4. Initially, a candidate CC is identified (block S114). In one embodiment, a determination is made as to whether a wideband signal to interference plus noise ratio (SINR) is greater than an SINR threshold (block S116). In other embodiments other channel condition indicators may be compared to a threshold. If the SINR is not greater than the threshold, the identified CC is not selected (block S124). If the SINR does exceed the SINR threshold, a determination is made as to whether a total amount of data in a queue is less than a queue threshold (block S118). If the total amount of data in the queue is greater than the queue threshold, then the identified CC is selected (block S122). Otherwise, if the data in the queue is less than the queue threshold, a determination is made as to whether the identified CC is the primary CC (block S120). If the identified CC is not the primary CC, then the identified CC is not selected (block S124). If the identified CC is the primary CC then the identified CC is selected (block S122). The process continues at block S114 with the identification of the next CC.

As another option for CC selection, a weight of a queue is calculated for each candidate CC during the validation stage (block S100). The weight of a queue may be based on, for example, an average throughput. In one embodiment, CCs with the highest weights are selected and CCs with low weights are not selected. If a CC is not selected for a queue, the PDCCH manager (block S106) will not consider the CC for PDCCH resource allocation. Conversely, if a CC is selected for a queue, the selected CC will not necessarily be considered for PDCCH resource allocation. All queues associated with a CC are examined to determine which queues are to be considered for PDCCH resource allocation based on the weight of the queue.

Figure 5:
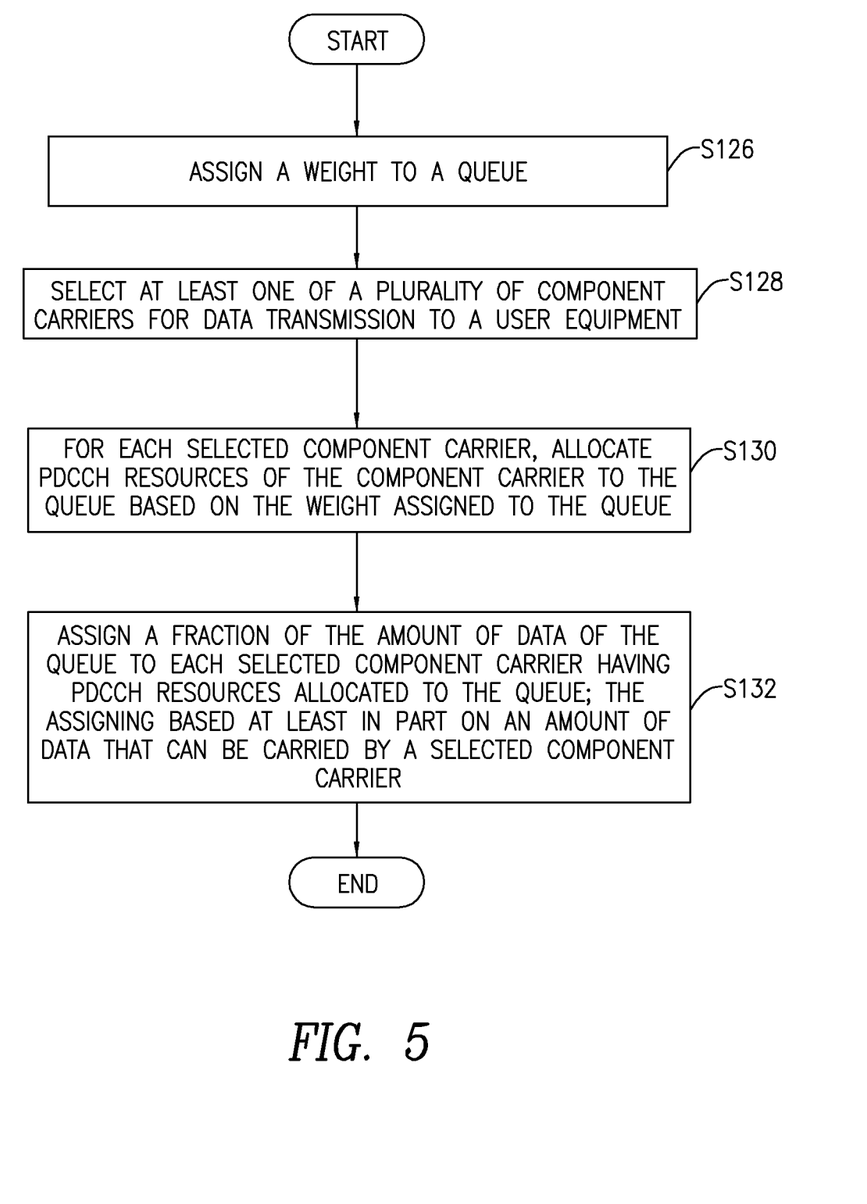
FIG. 5 is a more detailed flowchart of an exemplary process for allocating data to CCs in accordance with principles of the present invention.

FIG. 5 is a more detailed flowchart of an exemplary process for allocating data to CCs in accordance with principles of the present invention. In a validation stage, a weight is assigned to at least one queue of data destined for a UE (block S126). At least one of a plurality of CCs are selected to transmit data to a UE (block S128). For each selected CC, PDCCH resources are allocated based on the weight assigned to the queue (block S130). A fraction of the amount of data of the queue is assigned to each selected CC having PDCCH resources allocated to the queue. The assigning of blocks of data is based at least in part on an amount of data that can be carried by a selected CC (block S132). Further, the assigning of blocks of data may be based at least in part on a weight associated with the queue.

Even if a CC is selected in the first stage described above, the CC may not be considered for servicing the queue in the second stage. For example, the weight of the queue for the CC may be too low to be considered for PDCCH resource allocation. An amount of data in a queue to be assigned to a CC may be determined only for the CCs that have PDCCH resources assigned for the queue. Before the second stage of queue splitting, each cell in a group of cells for transmitting data of a queue will output a list of queues for which PDCCH resources are allocated, where each queue is associated with a weight. The queues from all cells within a group are combined and sorted according to weight from high to low. Thus, PDCCH resources may be allocated to a list of queues in order of decreasing weight.

Figure 6:
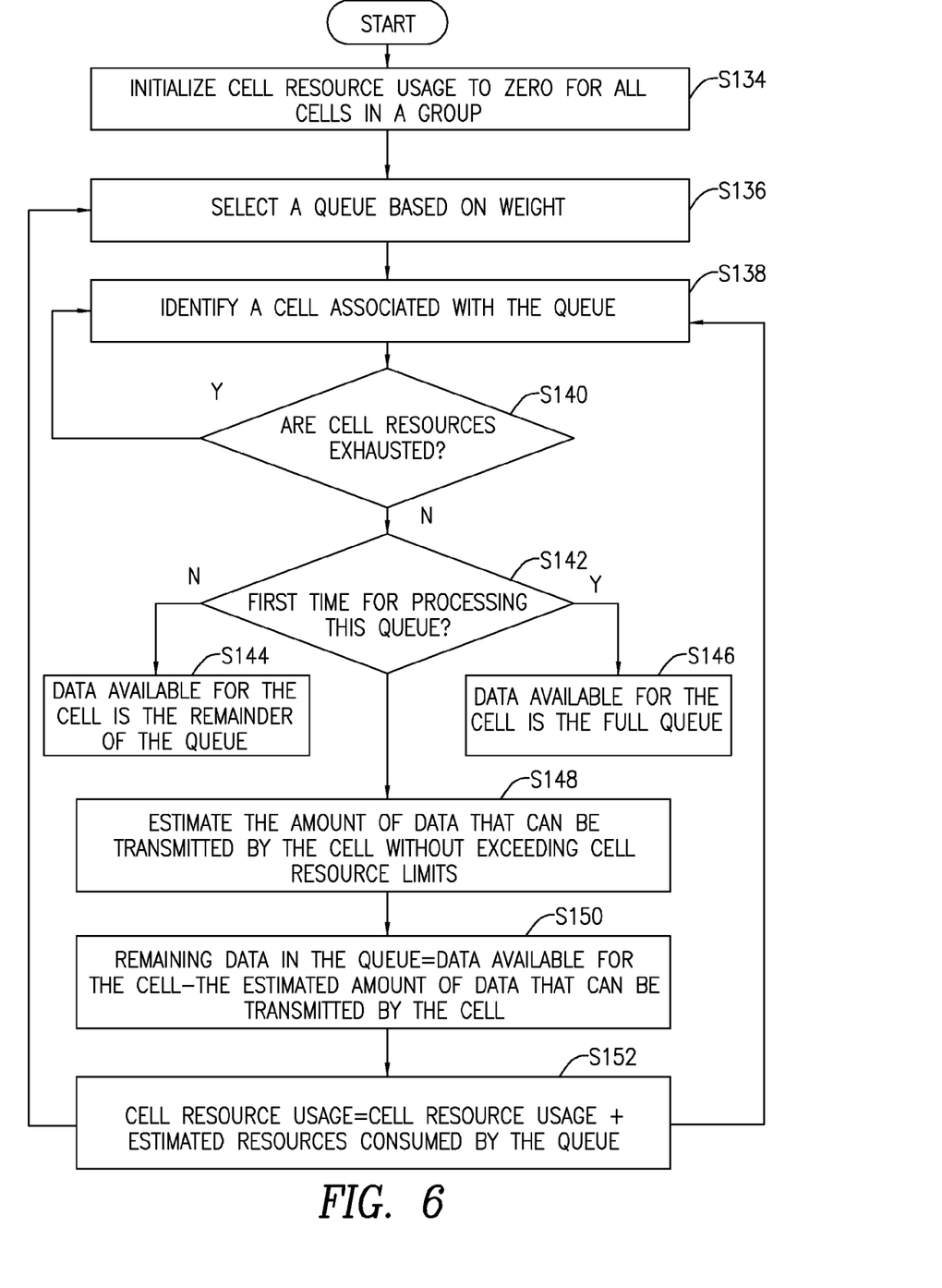
FIG. 6 is a flowchart of an exemplary process for allocating data among a plurality of CCs in accordance with principles of the present invention.

An exemplary process for allocating data among a plurality of CCs in accordance with principles of the present invention is shown in FIG. 6. Initially, cell resource usage is set to zero for all cells in a group seen by a UE (S134). Then a queue is selected based on weight S(136). For example, a queue with a higher weight is selected before a queue with a lower weight. Next, a cell associated with the queue is identified (block S138). A determination is made whether the resources of the identified cell are exhausted (block S140). If the resources of the identified cell are exhausted, another cell is identified (block S138).

If the resources of the identified cell are not exhausted, a determination is made whether the queue is being processed for the first time (block S142). If the queue is being processed for the first time, then the data available for the cell is the entire contents of the queue (block S146). If the queue is not being processed for the first time, then the data available for the cell is the remaining data in the queue (block S144). Next, the amount of data that can be transmitted by the cell without exceeding cell resource limits is determined (block S148). The remaining data in the queue is then determined to be equal to the data available for the cell minus the estimated amount of data that can be transmitted by the cell (block S150). Cell resource usage is calculated to be equal to the prior cell resource usage plus estimated resources consumed by the queue (block S152). The process then continues with the next cell (block S138).

There are at least several ways to estimate the amount of data that can be transmitted from a cell given the amount of data available and the cell resource limits. One way is to derive wideband SINR from wideband CQI and then map the wideband SINR to a modulation and coding scheme (MCS). Given the MCS, one can estimate the number of bits that can be transmitted by one physical resource block (PRB). Based on the estimated number of PRBs that can be assigned to the queue, one can estimate the number of bits that can be transmitted from a cell. The number of PRBs that can be assigned to the queue can be the available PRBs with good channel conditions for the UE in case of frequency selective scheduling. The number of PRBs that can be assigned to the queue can also be the total number of available PRBs at the time of scheduling if scheduling is not frequency selective. Due to estimation errors, cell resource limits may include margins to avoid over allocation of resources.

Thus, the assigning of blocks of data from a queue to a selected component carrier is based at least in part on an estimated resource usage of a cell. The estimated resources usage may be based at least in part on a number of physical resource blocks of the cell that are assigned to the queue. In turn, the number of physical resource blocks assigned to the queue may be based at least in part on a chosen modulation and coding scheme. The chosen modulation and encoding scheme may be based at least in part on channel quality.

When pooling and queue splitting are performed jointly, the process of FIG. 6 may be modified to account for a pooled resource limit. Pseudo code for such a process is as follows:

```
Initialize cell resource usage to zero for all cells in a group
Initialize pooled resource usage to zero
Loop the sorted queues
    Identify the cell to which the queue belongs
        If the cell resources are not exhausted & pooled resources are
        not exhausted:
            If it is the first time the queue is processed:
                Data available for the cell = full amount of data in the
                queue
            Else:
                Data available for the cell = remaining data in the
                queue
            Endif:
            Given the amount of data available for the cell, estimate the
            amount of data that will be transmitted from the cell
            without exceeding the cell resource limits and the pooled
            resource limits;
            Remaining data in the queue = Data available for the cell −
            estimated amount of data that will be transmitted from the
            cell;
            Cell resource usage = Cell resource usage + estimated
            resources consumed by the queue;
            Pooled resource usage = Pooled resource usage + estimated
            resources consumed by the queue;
        Endif:
End.
```

The estimated cell resource usage given by this algorithm can be used to determine the resources assigned to a cell for resource pooling.

Assuming data from a queue is to be transmitted on N component carriers, the estimated number of bits that can be transmitted by each CC is given by $M_i$. If there are a total number of L bits in the queue, the number of bits assigned to a CC is given by:

$$\frac{L * M_i}{\sum_{\forall j} M_j}$$

In some embodiments a cell load is considered when distributing bits of a queue so that carrier aggregation prefers cells that are not heavily utilized. One way to achieve this is to measure an average number of bits assigned to the CCs over time, and use this average in conjunction with a number of bits in the queue to determine how many bits to assign to a CC, as follows:

$$L * \frac{M_i^\beta}{B_i^{1-\beta}} * \frac{\left(\sum_{\forall j} B_j\right)^{1-\beta}}{\left(\sum_{\forall j} M_j\right)^\beta}$$

where $\beta$ is a parameter to balance how much emphasis will be placed on the number of bits that the UE can transmit on a carrier ($M_i$) versus how loaded the carrier ($B_i$) is. A simple filter can be used to calculate the number of assigned bits averaged over time:

$$B(t)_i = \alpha * B(t-1)_i + (1-\alpha) * \Sigma \text{assignedBitsForAllUsers}$$

where $\alpha$ is a parameter establishing how much emphasis is placed on new values. The algorithms described herein can be used for both downlink and uplink carrier aggregation. For uplink carrier aggregation, in addition to queue splitting, transmit power needs to be split as well to allow for parallel operation.

Thus, the embodiments described herein use a parallel approach to component carrier aggregation. Whether to assign data from a queue to a CC is performed in a first phase. How much data to allocate to the CC is performed in a second phase. The decision of how much data to allocate to a CC is preferably performed as late as possible within the transmission time interval, TTI, to ensure a good estimate of the data that can be carried by the CC. This results in greater throughput and efficient use of PDCCH resources. Further, the algorithms described herein are simple and fast, thereby conserving time and processor resources for scheduling and link adaptation.

The present invention can be realized in hardware, or a combination of hardware and software. Any kind of computing system, or other apparatus adapted for carrying out the methods described herein, is suited to perform the functions described herein. A typical combination of hardware and software could be a specialized computer system, having one or more processing elements and a computer program stored on a storage medium that, when loaded and executed, controls the computer system such that it carries out the methods described herein. The present invention can also be embedded in a computer program product, which comprises all the features enabling the implementation of the methods described herein, and which, when loaded in a computing system is able to carry out these methods. Storage medium refers to any volatile or non-volatile tangible storage device.

Computer program or application in the present context means any expression, in any language, code or notation, of a set of instructions intended to cause a system having an information processing capability to perform a particular function either directly or after either or both of the following a) conversion to another language, code or notation; b) reproduction in a different material form.

It will be appreciated by persons skilled in the art that the present invention is not limited to what has been particularly shown and described herein above. In addition, unless mention was made above to the contrary, it should be noted that all of the accompanying drawings are not to scale. A variety of modifications and variations are possible in light of the above teachings without departing from the scope and spirit of the invention, which is limited only by the following claims.

What is claimed is:

1. A method of carrier aggregation scheduling in a communication system, the method comprising:
   selecting at least one of a plurality of component carriers from a group of candidate component carriers upon which to transmit data in a queue, when more than one component carrier is selected, the selecting of all the plurality of selected component carriers being performed prior to determining an amount of data to be assigned to any one of the selected component carriers;
   allocating physical downlink control channel, PDCCH, resources to each selected component carrier of the group of candidate component carriers prior to assigning of blocks of data from the queue; and
   assigning blocks of data from the queue to at least one of the plurality of component carriers based at least in part on an estimated amount of data that can be carried by each selected component carrier.

2. The method of claim 1, wherein the selecting of a component carrier from the group of candidate component carriers is based at least in part on an amount of data in the queue.

3. The method of claim 1, wherein the selecting of a component carrier from the group of candidate component carriers is based at least in part on a channel condition associated with the component carrier.

4. The method of claim 1, wherein the assigning of blocks of data from the queue to at least one of the selected component carriers is based at least in part on a weight associated with the queue.

5. The method of claim 1, wherein the assigning of blocks of data from the queue to at least one of the selected component carriers is based at least in part on an estimated resource usage of a cell of the communication network, the cell being one of a group of cells to which the plurality of the selected component carriers are assignable.

6. The method of claim 5, wherein the estimated resource usage is based at least in part on a number of physical resource blocks, PRB, of the cell that are assignable to the queue.

7. The method of claim 6, wherein the number of physical resource blocks assignable to the queue is based at least in part on a channel quality.

8. A system for allocating data of a queue to at least one component carrier of a group of candidate component carriers, the allocated data to be transmitted to a user equipment, UE, the system comprising:
   a memory, the memory configured to store:
      a queue of data to be transmitted to the UE; and
   a processor, the processor in communication with the memory, the processor configured to:
      select the at least one component carrier from the group of candidate component carriers at which to transmit data from the queue, when more than one component carrier is selected, the selecting of all of the more than one selected component carriers being performed prior to determining an amount of data that any one of the selected component carriers can carry;

schedule physical downlink control channel, PDCCH, resources for transmission by each of the at least one component carrier selected from the group of candidate component carriers; and allocate data of the queue among each of the at least one component carrier selected from the group of candidate component carriers, the allocation based at least in part on an estimated amount of data that each of the at least one component carrier can carry, an amount of data being allocated to a particular selected component carrier for which physical downlink control channel, PDCCH, resources are allocated for transmission by the particular selected component carrier.

9. The system of claim 8, wherein selecting at least one component carrier is based at least in part on a channel condition.

10. The system of claim 8, wherein selecting at least one component carrier is based at least in part on an amount of data in the queue.

11. The system of claim 8, wherein PDCCH resources are allocated for transmission by the particular selected component carrier based at least in part on a weight associated with the queue.

12. The system of claim 11, wherein a weight associated with the queue is based at least in part on an average data rate.

13. The system of claim 8, wherein the processor is further configured to estimate resources consumed by allocation of data of the queue among each of the at least one component carrier selected from the group of candidate component carriers.

14. The system of claim 8, wherein the selected at least one component carrier are selected from a pool of component carriers shared by a plurality of communication cells.

15. A method of allocating data of a queue to at least one of a plurality of component carriers, the data of the queue being destined to a user equipment, UE, the method comprising:

assigning a weight to the queue;

selecting at least one of the plurality of component carriers for data transmission to the UE, the plurality of component carriers being a set of candidate component carriers available for transmission, when more than one component carrier is selected, the selecting of all of the more than one the selected component carriers being performed prior to determining an amount of data to be carried by any one of the selected component carriers;

for each selected component carrier, allocating physical downlink control channel, PDCCH, resources of the component carrier to the queue based on the weight assigned to the queue;

assigning a fraction of the amount of data of the queue to each selected component carrier that has PDCCH resources allocated to the queue, the assigning of a fraction of the amount of data based at least in part on an estimated amount of data that can be carried by the selected component carrier; and estimating a resource usage associated with transmitting the assigned fraction of the amount of data of the queue on a component carrier.

16. The method of claim 15, wherein the selected component carriers are selected from a pool of component carriers shared by a plurality of communication cells.

17. The method of claim 15, further comprising outputting a list of queues that have been allocated PDCCH resources by a component carrier.

18. The method of claim 17, wherein queues of the list are sorted according to a weight assigned to each queue.

19. The method of claim 18, wherein PDCCH resources are allocated to the listed queues in order of decreasing weight.

* * * * *